United States Patent
Huang

(10) Patent No.: US 9,857,525 B2
(45) Date of Patent: Jan. 2, 2018

(54) DOUBLE-SIDED DISPLAY

(71) Applicant: LWO TECHNOLOGY CO. LTD., Tainan (TW)

(72) Inventor: Fu-Lung Huang, Tainan (TW)

(73) Assignee: LWO Technology Co. Ltd., Tainan (TW)

(*) Notice: Subject to any disclaimer, the term of this patent is extended or adjusted under 35 U.S.C. 154(b) by 95 days.

(21) Appl. No.: 15/048,083

(22) Filed: Feb. 19, 2016

(65) Prior Publication Data

US 2016/0349443 A1 Dec. 1, 2016

(30) Foreign Application Priority Data

Jun. 1, 2015 (TW) ............................... 104117630 A

(51) Int. Cl.
- *G02B 6/00* (2006.01)
- *F21V 8/00* (2006.01)
- *G02F 1/1335* (2006.01)
- *G02F 1/1333* (2006.01)

(52) U.S. Cl.
CPC ............. *G02B 6/0055* (2013.01); *G02B 6/00* (2013.01); *G02B 6/0036* (2013.01); *G02B 6/0043* (2013.01); *G02B 6/0053* (2013.01); *G02B 6/0061* (2013.01); *G02B 6/0063* (2013.01); *G02F 1/133615* (2013.01); *G02F 2001/133342* (2013.01); *G02F 2001/133507* (2013.01)

(58) Field of Classification Search
CPC .............................. G02B 6/0038; G02B 6/004
See application file for complete search history.

(56) References Cited

U.S. PATENT DOCUMENTS

| | | | | |
|---|---|---|---|---|
| 6,831,711 B2* | 12/2004 | Choi | .................... | G02B 5/3083 349/114 |
| 7,503,684 B2* | 3/2009 | Ueno | ................... | G02B 6/0036 362/600 |
| 7,750,982 B2* | 7/2010 | Nelson | ..................... | G02B 3/08 348/51 |
| 9,417,376 B2* | 8/2016 | Sykora | ................. | G02B 3/0062 |
| 2004/0017529 A1 | 1/2004 | Choi et al. | | |
| 2006/0050199 A1* | 3/2006 | Hsu | ................... | G02F 1/133615 349/64 |

(Continued)

OTHER PUBLICATIONS

Search Report dated Oct. 12, 2016 by EPO for the corresponding EP Patent Application No. 16171898.6.

*Primary Examiner* — Christle I Marshall
(74) *Attorney, Agent, or Firm* — WPAT, P.C., Intellectual Property Attorneys; Anthony King

(57) ABSTRACT

A double-sided display may include a first panel module and a second panel module, a light-guiding plate, a first light source, and a brightness enhancement film. A light-guiding plate has a second light output surface, and a plurality of reflecting units are formed at the second light output surface. Also, a plurality of light converging units are protruding from a surface of the brightness enhancement film. By controlling the width between two adjacent light converging units of the brightness enhancement file to be greater than the width of each of the reflection units, the display quality of the second panel module is enhanced. Thus, the goal of high brightness and high quality on both sides of the display can be achieved.

20 Claims, 4 Drawing Sheets

(56) References Cited

U.S. PATENT DOCUMENTS

2008/0068863 A1* 3/2008 Liao ................... G02B 6/0043
362/623
2012/0287677 A1* 11/2012 Wheatley ............ G02B 6/0051
362/627

* cited by examiner

DOUBLE-SIDED DISPLAY

FIELD OF THE INVENTION

The present invention relates to a display, and more particularly to a double-sided display.

BACKGROUND OF THE INVENTION

Referring to FIG. 1, generally, the conventional double-sided display comprises a first panel module (11) and a second panel module (12) spaced from each other, and a light-guiding plate (13) is formed between the first panel module (11) and the second panel module (12). Also, a light source (14) is formed at a lateral side of the light-guiding plate (13). The light-guiding plate (13) comprises a first light output surface (131), a second light output surface (132), and a light input surface (133). The first light output surface (131) faces the first panel module (11), while the second light output surface (132) faces the second panel module (12). The light input surface (133) is formed at a lateral side of the light-guiding plate (13). When the light provided by the light source (14) enters the light-guiding plate (13) from the light input surface (133), a portion of light goes toward the second light output surface (132), and is reflected by multiple dot structures (134) formed on the second light output surface (132). The light reflected from dot structures (134) is configured to reach the first light output surface (131) to provide the need of light for the first panel module (11).

However, the conventional double-sided display is disadvantageous because in general, the first panel module (11) is regarded as a primary display, and is able to receive the majority of the light. The second panel module (12), regarded as a secondary display, is not able to receive sufficient light as the first panel module (11), so the brightness and display quality of the second panel module (12) is not as good. Therefore, there remains a need for a new and improved design for a double-sided display to overcome the problems presented above.

SUMMARY OF THE INVENTION

The present invention provides a double-sided display, which comprises a first panel module and a second panel module, a light-guiding plate, a first light source, a second light source, and a brightness enhancement film. The light-guiding plate is formed between the first panel module and the second panel module, and comprises a first light output surface facing the first panel module and a second light output surface facing the second panel module. A first light input surface is formed at one side of the light-guiding plate, and a plurality of reflecting units are formed at the second light output surface. A first light source is formed at one side of the first light input surface of the light-guiding plate. The brightness enhancement film is located between the second light output surface of the light-guiding plate and the second panel module, and a plurality of light converging units are protruding from a surface of the brightness enhancement film. A width between two peaks of the two adjacent light converging units of the brightness enhancement film is greater than a width of each of the reflection units.

In another embodiment, the double-sided display of the present invention is formed without the brightness enhancement film, and a width of each of the reflecting units is from 11 μm to 13 μm.

In still another embodiment, the double-sided display of the present invention is formed without the brightness enhancement film, and the light guiding plate has a second light input surface spaced from the first light input surface. The double-sided display also includes a second light source located on one side of the second light input surface. A density of the reflecting units on a central portion of the light-guiding plate is greater than that near the first and second light input surfaces.

Comparing with conventional double-sided displays, the present invention is advantageous because in the first embodiment mentioned above, by controlling the width between the two peaks of the two adjacent light converging units of the brightness enhancement film to be greater than the width of each of the reflection units, the second light output surface is able to receive more light to provide sufficient light for the second panel module to improve the display quality. As a result, both sides of the double sided display in the present invention can achieve the goal of high brightness and high quality. The second and third embodiments mention above also can achieve high brightness and display quality.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
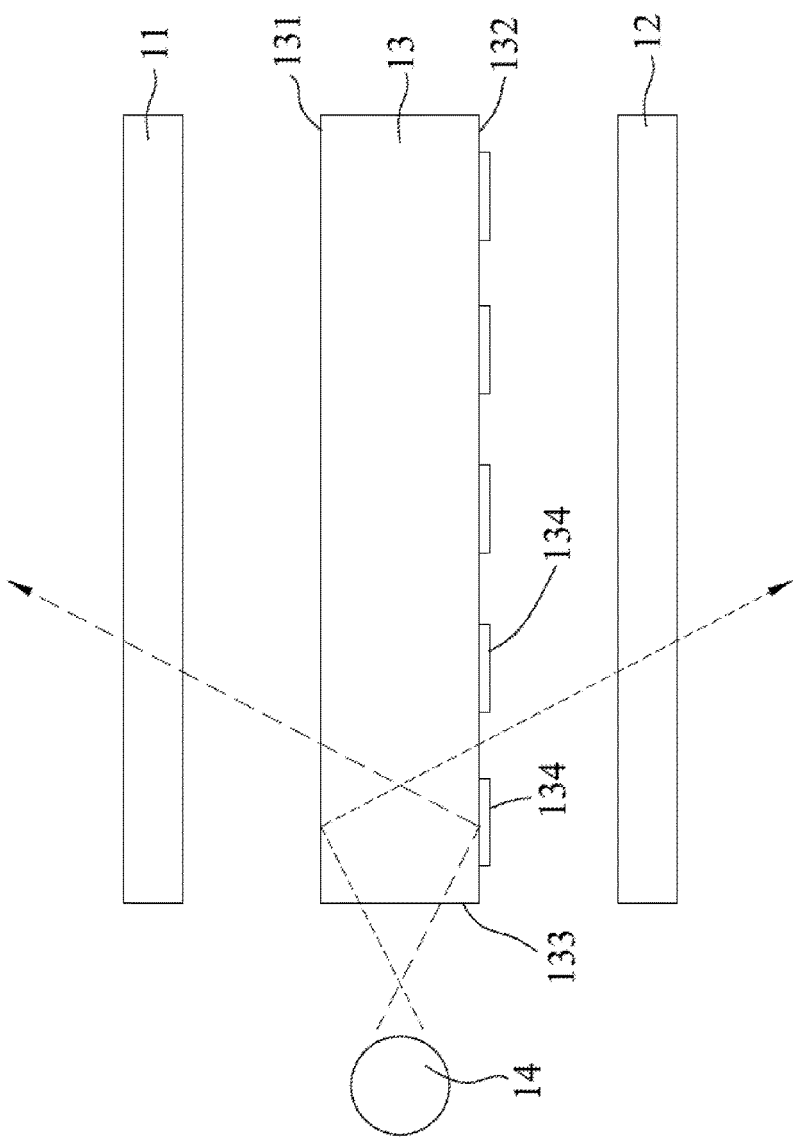
FIG. 1 is a prior art, and arrows in the figure show the directions of the light.
Figure 2:
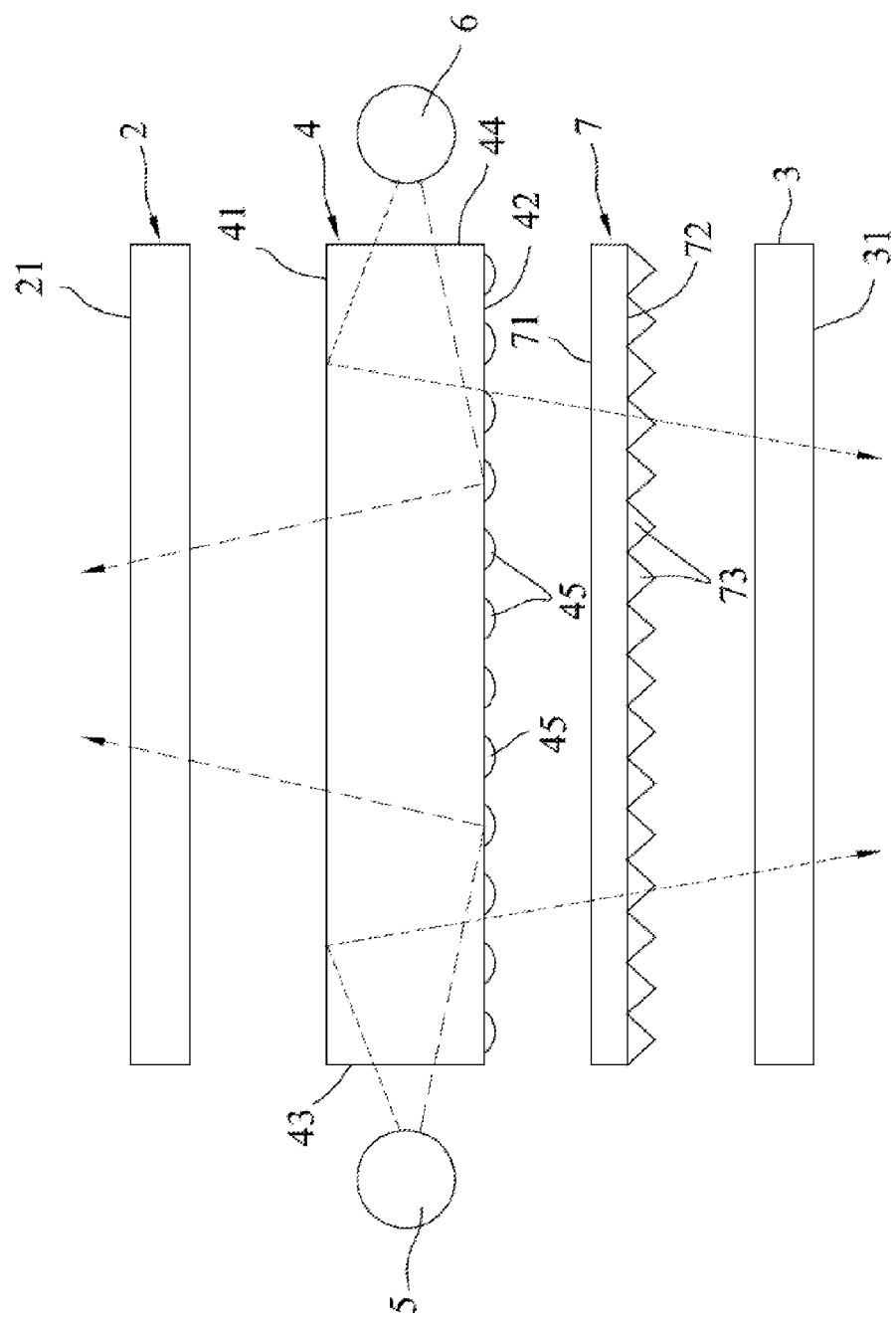
FIG. 2 is a schematic view of one embodiment of the double-sided display in present invention, and arrows in the figure show the directions of the light.
Figure 3:
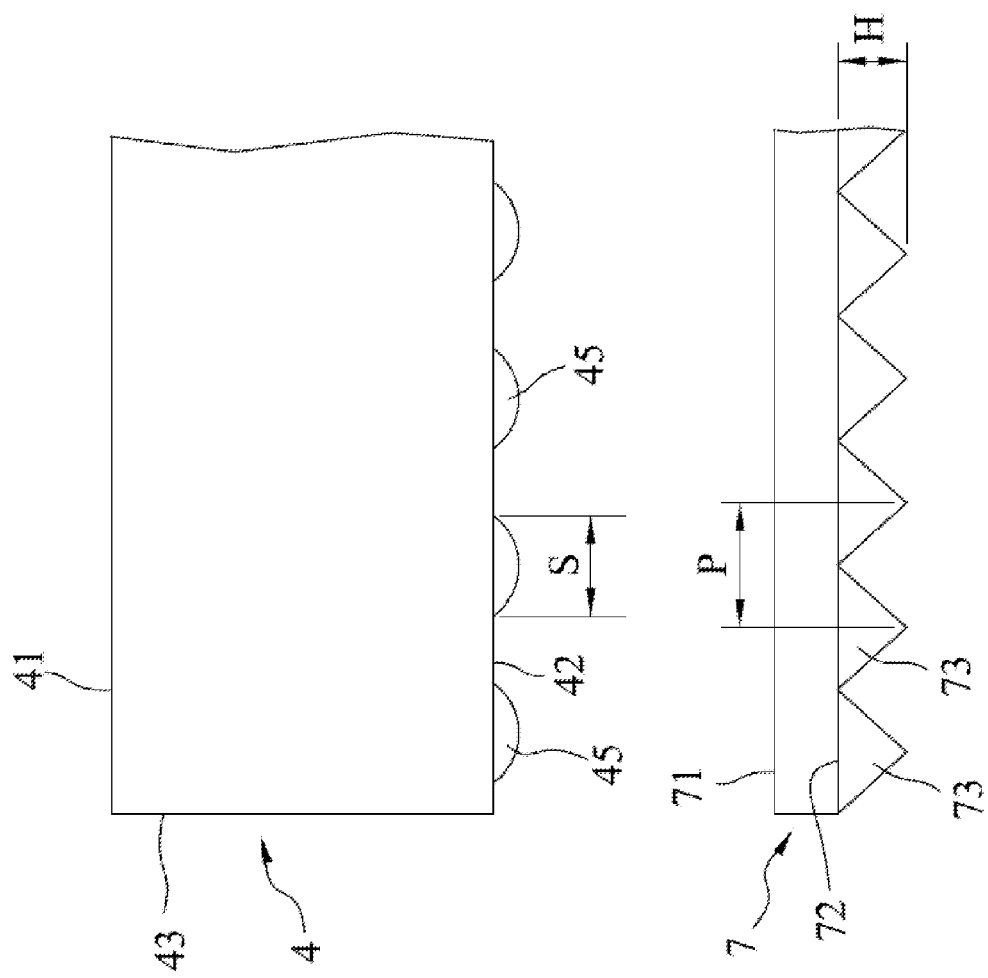
FIG. 3 is a partial enlarged view illustrating the light guiding plate and the brightness enhancement film of another embodiment of the double-sided display in present invention.

In order to further understand the goal, characteristics and effect of the present invention, a number of embodiments along with the drawings are illustrated as following:

In one aspect, referring to FIGS. 2 and 3, the present invention provides a double-sided display, which comprises a first panel module (2) and a second panel module (3), a light-guiding plate (4), a first light source (5), a second light source (6), and a brightness enhancement film (7).

In one embodiment, the first panel module (2) and the second panel module (3) are LCD panel modules. Each of the first panel module (2) and the second panel module (3) has a first display (21) and a second display (31) respectively, and the first display (21) and the second display (31) are facing opposite directions. The first panel module (2) is configured as a primary display panel, and is defined as a front side of the double-sided display. The second panel module (3) is configured as a secondary display panel, and is defined as a back side of the double-sided display. Each of the first panel module (2) and the second panel module (3) comprises a polarizing film, a liquid crystal layer, an alignment film, a color filter array, a glass substrate, and other components. However, the structures of the first panel module (2) and the second panel module (3) are not the key technologies of the present invention, so that the components mentioned above will not be described in detail in the present invention.

The light-guiding plate (4) is formed between the first panel module (2) and the second panel module (3), and comprise a first light output surface (41) facing the first panel module (2) and a second light output surface (42) facing the second panel module (3). A first light input surface (43) is formed at a first lateral side of the light-guiding plate (4), while a second light input surface (44) is formed at a second lateral side of the light-guiding plate (4). A plurality of reflecting units (45) formed at the second light output surface (42) are configured to reflect the light back toward the first light output surface (41). When in use, one portion of the light reaching the second light output surface (42) is reflected by the reflecting units (42) toward the first light output surface (41), and the other portion of the light passes through the second light output surface (42) to reach the second panel module (3). In one embodiment, the reflecting unit (45) is made by printing ink dots, and the printing ink dots can also contain light diffusing agent. The places with printing ink dots on the second light output surface (42) are formed into matt surfaces to reflect the light. In another embodiment, the reflecting units (45) are formed by directly etching the second light output surface (42) to form an uneven surface to generate the reflection effect. In still another embodiment, the reflecting units (45) of the second light output surface (42) can be formed in the molding process of the light-guiding plate (4).

The reflecting units (45) of present invention can be shaped into square, arc, or triangle shape. However, according to testing results, the arc-shaped is a preferred embodiment. A width of each of the reflection units (45) is defined as a width (S), and the preferred width (S) is in a range from 11 μm to 13 μm. Since it is difficult in the manufacturing process when the width (S) is too small, and when the width (S) is over 13 μm, the light mixing effect of the reflecting unit (45) is reduced. Thus, when the width (S) is controlled in a range from 11 μm to 13 μm, the reflecting units (45) are able to achieve the desired scattering effect. Also, the light reaching the reflecting units (45) on second light output surface (42) is able to be efficiently reflected toward the first light output surface (41). Meanwhile, in the structure of present invention, the light reflected from the first light output surface (41) is also able to pass through the second light output surface (42) to reach the second panel module (3).

The first light source (5) is located at one side of the first light input surface (43) of the light-guiding plate (4), and the second light source (6) is located at one side of the second light input surface (44) of the light-guiding plate (4). Thus, the first panel module (2) and the second panel module (3) are able to receive uniform light from the first light source (5) and the second light source (6). However, when in use, the first panel module (2) and the second panel module (3) are able to receive sufficient light, even if the double-sided display of the present invention only has the first light source (5).

The brightness enhancement film (7) is located between the second light output surface (42) of the light-guiding plate (4) and the second panel module (3). The brightness enhancement film (7) comprises a light enhancing input surface (71) facing the light-guiding plate (4), a light enhancing output surface (72) facing the second panel module (3), and a plurality of light converging units (73) protruding from the light enhancing output surface (72). In one embodiment, the brightness enhancement film (7) is made by coating a PMMA layer on a surface of a PET substrate, and the converging units (73) are formed on the PMMA layer after a rolling process. A width between two peaks of the two light converging units (73) is defined as a width (P). The width (P) is greater than the width (S) in the reflecting unit (45), and thus the light passing through the second light output surface (42) is able to efficiently pass through the brightness enhancement film (7) to the second panel module (3). Also, since the light passes through the brightness enhancement film (7) before it reaches the second panel module (3), the brightness of the light is enhanced to provide sufficient light for the second panel module (3). When a portion of light passes through the reflecting unit (45) to the brightness enhancement film (7), the light may be scattered to different directions and over the size of the reflecting unit (45), which is totally undesired because the reflecting unit (45) may be seen by the user, so the size of the reflecting unit (45) should not be too large. With the design of width (P) greater than width (S) in the present invention, the light guiding effect is enhanced to prevent the reflecting unit (45) from being shown to further improve the display quality.

The width (P) is defined as the width between two peaks of the two adjacent light converging units (73). The preferred width (P) is in a range from 25 μm to 50 μm, and the preferred height (H) of each of the light converging units (73) is in a range from 10 μm to 20 μm to achieve optimized converging effect. The height (H) is defined as a vertical distance from a surface of the brightness enhancement film (7) to the peak of the light converging unit (73). In one embodiment, the light converging units (73) are arranged in rows, and are shaped into triangular prism, half-cylinder, square column, trapezoidal column, or etc. In another embodiment, the light converging units (73) are arranged side by side to form a pyramid structure or an island-shaped structure.

When in use, after the light from the first light source (5) passes through the first light input surface (43) to reach inside of the light-guiding plate (4), a portion of the light reaching the second light output surface (42) is reflected back by the reflecting units (45) toward the first light output surface (41) to provide the need of light for the first panel module (2). The other portion of the light is reflected by the first light output surface (41) toward the second light output surface (42) to provide the need of light for the second panel module (3). Similarly, after the light from the second light source (6) passes through the second light input surface (44) to reach inside of the light-guiding plate (4), a portion of the light passes through the first light output surface (41) while the other portion of the light passes through the second light output surface (42). Regardless of the light coming from the first light source (5) or the second light source (6), the majority of the light is from the first light output surface (41) for the first panel module (2). On the other hand, the light passing through the second light output surface (42) is able to be converged into a given angle range by the light converging units (73) of the brightness enhancement film (7) to improve the brightness and central angular luminance of the second panel module (3).

Moreover, a second brightness enhancement film (not shown) is formed between the first panel module (2) and the first light output surface (41) of the light-guiding plate (4) to enhance the brightness of the first panel module (2). The structure and dimension of the second brightness enhancement film can be the same as the brightness enhancement film (7), and a plurality of the second light converging units formed on a surface of the second brightness enhancement film are facing the first panel module (2).

In summary, the present invention has the brightness enhancement film (7), and the width (P) between the two peaks of the two adjacent light converging units (73) of the brightness enhancement film (7) is greater than the width (S) of the reflection unit (45). Thus, the second light output surface (42) is able to receive more light to provide sufficient light for the second panel module (3) to improving the display quality. As a result, both of the first panel module (2) and the second panel module (3) have sufficient brightness and high display quality. Also, since the present invention controls the width (S) of the reflecting unit (45) in a range from 11 μm to 13 μm, the double-sided of the present invention can still achieve high display quality even without the brightness enhancement film (7).

Figure 4:
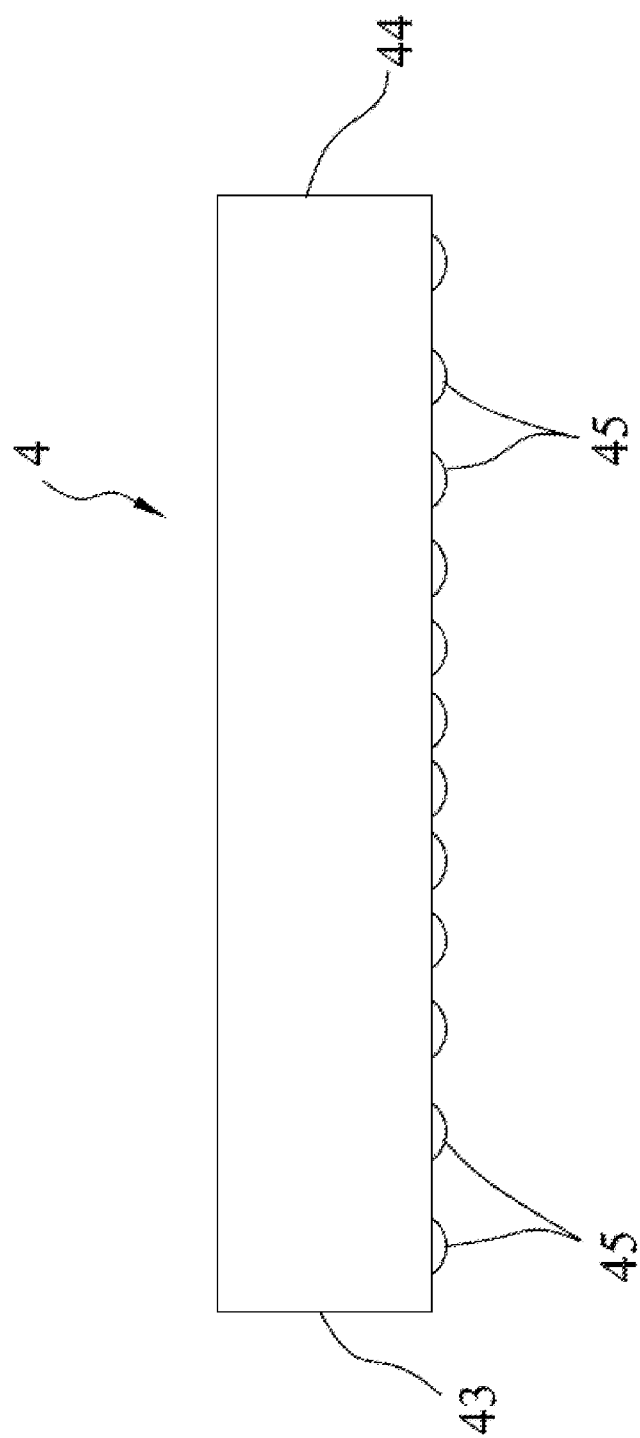
FIG. 4 is a schematic view of another embodiment of the double-sided display in present invention, and arrows in the figure show the directions of the light.

Referring to FIG. 4, in another embodiment of double-sided display in present invention, a density of the reflecting units (45) on a central portion of the light-guiding plate (4) is greater than that near the first light input surface (43) and the second light input surface (44). Since the light intensity is stronger from both sides of the light guiding plate (4) and weaker in the central portion thereof, the arrangement of the reflecting units (45) on the light-guiding plate (4) can not only achieve the goal of the sufficient brightness and the high display quality, but also the uniformity of the light.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A double-sided display comprising:
a first panel module and a second panel module spaced from each other;
a light-guiding plate formed between the first panel module and the second panel module, comprising a first light output surface facing the first panel module, a second light output surface facing the second panel module, a first light input surface located on one side of the first light output surface and second light output surface, and a plurality of reflecting units formed on the second light output surface;
a first light source located on one side of the first light input surface of the light-guiding plate; and
a brightness enhancement film located between the second light output surface of the light-guiding plate and the second panel module, and a plurality of light converging units protruding from a surface of the brightness enhancement film, a width between two peaks of two adjacent light converging units of the brightness enhancement film greater than a width of each of the reflection units.

2. The double-sided display of claim 1, wherein the width of each of the reflecting units is from 11 μm to 13 μm.

3. The double-sided display of claim 1, wherein the width between two peaks of two adjacent light converging units is from 25 μm to 50 μm.

4. The double-sided display of claim 3, wherein the light-guiding plate comprises a second light input surface located at an opposite side of the first light input surface, and a second light source located on one side of the second light input surface.

5. The double-sided display of claim 4, wherein the brightness enhancement film comprises a light enhancing input surface facing the light-guiding plate, and a light enhancing output surface facing the second panel module, and the light converging units are protruding from the light enhancing output surface.

6. The double-sided display of claim 1, wherein the light-guiding plate comprises a second light input surface located at an opposite side of the first light input surface, and a second light source located on one side of the second light input surface.

7. The double-sided display of claim 3, wherein a height of the light converging unit is from 10 μm to 20 μm.

8. A double-sided display, comprising:
a first panel module and a second panel module spaced from each other;
a light-guiding plate formed between the first panel module and the second panel module, comprising a first light output surface facing the first panel module, a second light output surface facing the second panel module, a first light input surface located on one side of the first light output surface and a second light output surface, and a plurality of reflecting units formed on the second light output surface, and a width of each of the reflecting units is from 11 μm to 13 μm; and
a first light source located on one side of the first light input surface of the light-guiding plate.

9. The double-sided display of claim 8, wherein the double-sided display comprises a brightness enhancement film located between the second light output surface of the light-guiding plate and the second panel module, and a plurality of light converging units are protruding from a surface of the brightness enhancement film, and a width between two peaks of each two adjacent light converging units of the brightness enhancement film is greater than the width of each of the reflection units.

10. The double-sided display of claim 9, wherein a space between two adjacent light converging units is from 25 μm to 50 μm.

11. The double-sided display of claim 8, wherein the light-guiding plate comprises a second light input surface located at an opposite side of the first light input surface, and a second light source located on one side of the second light input surface.

12. The double-sided display of claim 11, wherein the brightness enhancement film comprises a light enhancing input surface facing the light-guiding plate, and a light enhancing output surface facing the second panel module, and the light converging units are protruding from the light enhancing output surface.

13. The double-sided display of claim 9, wherein the light-guiding plate comprises a second light input surface located at an opposite side of the first light input surface, and a second light source located on one side of the second light input surface.

14. The double-sided display of claim 10, wherein a height of the light converging unit is from 10 μm to 20 μm.

15. A double-sided display, comprising:
a first panel module and a second panel module spaced from each other;
a light-guiding plate formed between the first panel module and the second panel module, comprising a first light output surface facing the first panel module, a second light output surface facing the second panel module, a first light input surface located on one side of the first light output surface and a second light output surface, and a plurality of reflecting units formed on the second light output surface;
a first light source located on one side of the first light input surface of the light-guiding plate;
wherein the light-guiding plate comprises a second light input surface located at an opposite side of the first light input surface, and a second light source facing the second light input surface; and wherein a density of the reflecting units on a central portion of the light-guiding plate is greater than a density of the reflecting units near the first light input surface and the second light input surface.

16. The double-sided display of claim 15, wherein a width of each of the reflecting units is 11 μm to 13 μm.

17. The double-sided display of claim 15, wherein the double-sided display further comprises a brightness enhancement film located between the second light output surface of the light-guiding plate and the second panel module, and a plurality of light converging units are protruding from a surface of the brightness enhancement film, and a width between two peaks of each two adjacent light converging units of the brightness enhancement film is greater than the width of each of the reflection units.

18. The double-sided display of claim 17, wherein a space between two adjacent light converging units is from 25 μm to 50 μm.

19. The double-sided display of claim 17, wherein the brightness enhancement film comprises a light enhancing input surface facing the light-guiding plate, and a light enhancing output surface facing the second panel module, and the light converging units are protruding from the light enhancing output surface.

20. The double-sided display of claim 17, wherein a height of the light converging unit is from 10 μm to 20 μm.

* * * * *